United States Patent
Yamamoto et al.

(10) Patent No.: US 12,083,969 B2
(45) Date of Patent: Sep. 10, 2024

(54) WIRE HARNESS ROUTING DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Yamamoto, Mie (JP); Nahoko Furuhata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 154 days.

(21) Appl. No.: 17/641,910

(22) PCT Filed: Aug. 31, 2020

(86) PCT No.: PCT/JP2020/032833
§ 371 (c)(1),
(2) Date: Mar. 10, 2022

(87) PCT Pub. No.: WO2021/049344
PCT Pub. Date: Mar. 18, 2021

(65) Prior Publication Data
US 2022/0258683 A1 Aug. 18, 2022

(30) Foreign Application Priority Data
Sep. 12, 2019 (JP) ................................. 2019-166079

(51) Int. Cl.
*B60R 16/02* (2006.01)
*B60R 16/027* (2006.01)
*H02G 11/02* (2006.01)

(52) U.S. Cl.
CPC ........ *B60R 16/0215* (2013.01); *B60R 16/027* (2013.01); *H02G 11/02* (2013.01)

(58) Field of Classification Search
CPC ...... H02G 11/00; H02G 11/02; H02G 11/006; H02G 3/0475; B60R 16/02; B60R 16/0215; B60R 16/027
See application file for complete search history.

(56) References Cited

U.S. PATENT DOCUMENTS

2003/0121692 A1* 7/2003 Kato .................. B60R 16/0215
174/68.1
2005/0092512 A1* 5/2005 Kogure .................. H02G 11/00
174/72 A (Continued)

FOREIGN PATENT DOCUMENTS

JP 2001-069657 A 3/2001
JP 2004-095209 A 3/2004

(Continued)

OTHER PUBLICATIONS

International Search Report issued on Nov. 2, 2020 for WO 2021/049344 A1 (4 pages).

*Primary Examiner* — Paresh Paghadal
(74) *Attorney, Agent, or Firm* — Venjuris, P.C.

(57) ABSTRACT

A wire harness routing device 10 includes: a wire harness 11 with one end fixed to a slider 26 that is slidably arranged with respect to a rail 20 and another end pulled out from the rail 20; an excess length accommodating portion 40 that has an entrance 45 into which an excess length portion 11A of the wire harness 11 pulled out from the rail 20 is introduced and that is configured to spirally wind the excess length (Continued)

portion 11A and accommodate the excess length portion 11A therein; and a guide portion 30 that is disposed in the excess length accommodating portion 40 and that is configured to change a direction in which the excess length portion 11A enters the excess length accommodating portion 40 to an inward direction of the excess length accommodating portion 40 by coming into contact with the excess length portion 11A.

5 Claims, 9 Drawing Sheets

(56) References Cited

U.S. PATENT DOCUMENTS

| 2006/0131046 A1* | 6/2006 | Bump | H02G 3/123 |
| | | | 174/58 |
| 2019/0165530 A1* | 5/2019 | Katsuramaki | B60J 7/0573 |

FOREIGN PATENT DOCUMENTS

| JP | 2011-136598 A | 7/2011 |
| JP | 2012-257344 A | 12/2012 |
| JP | 2018-129903 A | 8/2018 |

* cited by examiner

WIRE HARNESS ROUTING DEVICE

CROSS REFERENCE TO RELATED APPLICATIONS

This application is a national phase of PCT application No. PCT/JP2020/032833, filed on 31 Aug. 2020, which claims priority from Japanese patent application No. 2019-166079, filed on 12 Sep. 2019, all of which are incorporated herein by reference.

TECHNICAL FIELD

The present disclosure relates to a wire harness routing device.

BACKGROUND

Conventionally, vehicles such as automobiles have slidable seats, and some seats are equipped with electrical equipment such as electric recliners and seat heaters. A wire harness that connects such electrical equipment to devices on the vehicle body side has a configuration for absorbing an excess length of the wire harness between the seat and the vehicle body in order to follow the sliding of the seat between the seat and the vehicle body.

For example, in Patent Document 1, an excess length absorbing box that accommodates the excess length of a wire harness by spirally winding the excess length is provided forward of a seat rail. The excess length absorbing box has an entrance through which an excess length portion of the wire harness is inserted and pulled out, in a side face on the seat rail side thereof, and also has a wire harness withdrawal port at a center portion around which the wire harness is spirally wound.

PRIOR ART DOCUMENT

Patent Document

Patent Document 1: JP 2011-136598 A

SUMMARY OF THE INVENTION

Problems to be Solved

With the above configuration, if the excess length portion of the wire harness is pushed in from the entrance toward the distal side of the excess length absorbing box, there is a concern that the excess length portion of the wire harness will be jammed in the excess length absorbing box and will not be able to further enter the excess length absorbing box.

The present disclosure has been completed based on the foregoing circumstances, and aims to provide a wire harness routing device in which an excess length portion can be smoothly accommodated.

Means to Solve the Problem

The present disclosure is a wire harness routing device including: a wire harness with one end fixed to a slider that is slidably arranged with respect to a rail and another end pulled out from the rail; an excess length accommodating portion that has an entrance into which an excess length portion of the wire harness pulled out from the rail is introduced and that is configured to spirally wind the excess length portion and accommodate the excess length portion therein; and a guide portion that is disposed in the excess length accommodating portion and that is configured to change a direction in which the excess length portion enters the excess length accommodating portion to an inward direction of the excess length accommodating portion by coming into contact with the excess length portion.

Effect of the Invention

According to the present disclosure, the excess length portion can be smoothly accommodated in the wire harness routing device.

DETAILED DESCRIPTION TO EXECUTE THE INVENTION

Description of Embodiment of Present Disclosure

Firstly, modes for carrying out the present disclosure will be listed and described.

(1) The present disclosure is a wire harness routing device including: a wire harness with one end fixed to a slider that is slidably arranged with respect to a rail and another end pulled out from the rail; an excess length accommodating portion that has an entrance into which an excess length portion of the wire harness pulled out from the rail is introduced and that is configured to spirally wind the excess length portion and accommodate the excess length portion therein; and a guide portion that is disposed in the excess length accommodating portion and that is configured to change a direction in which the excess length portion enters the excess length accommodating portion to an inward direction of the excess length accommodating portion by coming into contact with the excess length portion.

The direction in which the excess length portion enters the excess length accommodating portion is changed by the guide portion to the inward direction of the excess length accommodating portion. Thus, the excess length portion that has entered the excess length accommodating portion from the entrance is not pressed outward against a side wall of the excess length accommodating portion. As a result, a portion of the excess length portion that has entered the excess length accommodating portion and made one lap within the excess length accommodating portion is unlikely to be pressed against a portion of the excess length portion that is about to enter the excess length accommodating portion from the entrance. This configuration restrains the portion of the excess length portion that is about to enter the excess length accommodating portion from the entrance from being pressed against the side wall of the excess length accommodating portion, thus allowing the excess length portion to smoothly enter the excess length accommodating portion.

(2) It is preferable that the guide portion has a contact portion configured to come into contact with the wire harness, and the contact portion is movable in a radial direction of the excess length accommodating portion.

Movement of the contact portion in response to the accommodation state of the excess length portion in the excess length accommodating portion allows for the direction in which the excess length portion enters the excess length accommodating portion to change as appropriate.

(3) The guide portion has an elastic member configured to bias the excess length portion inward of the excess length accommodating portion.

Since the excess length portion is biased inward of the excess length accommodating portion by the elastic member, the excess length portion is restrained from being pressed against the side wall of the excess length accommodating portion. As a result, the excess length portion can smoothly enter the excess length accommodating portion.

(4) The elastic member has a leaf spring shape, and the excess length accommodating portion has a fixing portion configured to fix one end of the elastic member and a winding portion configured to wind another end of the elastic member.

The length by which the elastic member is wound by the winding portion changes in accordance with the length by which the excess length portion enters the excess length accommodating portion, making it possible to apply an appropriate biasing force to the excess length portion. This configuration allows the excess length portion to more smoothly enter the excess length accommodating portion.

DETAILS OF EMBODIMENTS OF PRESENT DISCLOSURE

Hereinafter, an embodiment of the present disclosure will be described. The present invention is not limited by the following examples but is indicated by the claims, and is intended to encompass all the changes made within the meaning and scope equivalent to the claims.

Embodiment 1

Embodiment 1 of the present disclosure will be described with reference to FIGS. 1 to 9. A wire harness routing device 10 of the present embodiment is fixed onto a floor below a seat 60 in a vehicle (not shown) such as an automobile, enabling routing of a wire harness 11 that is to be connected to electrical equipment of the seat 60. The following description will be given, assuming that the direction indicated by a Z arrow is an upward direction, the direction indicated by a Y arrow is a forward direction, and the direction indicated by an X arrow is a leftward direction.

Figure 1:
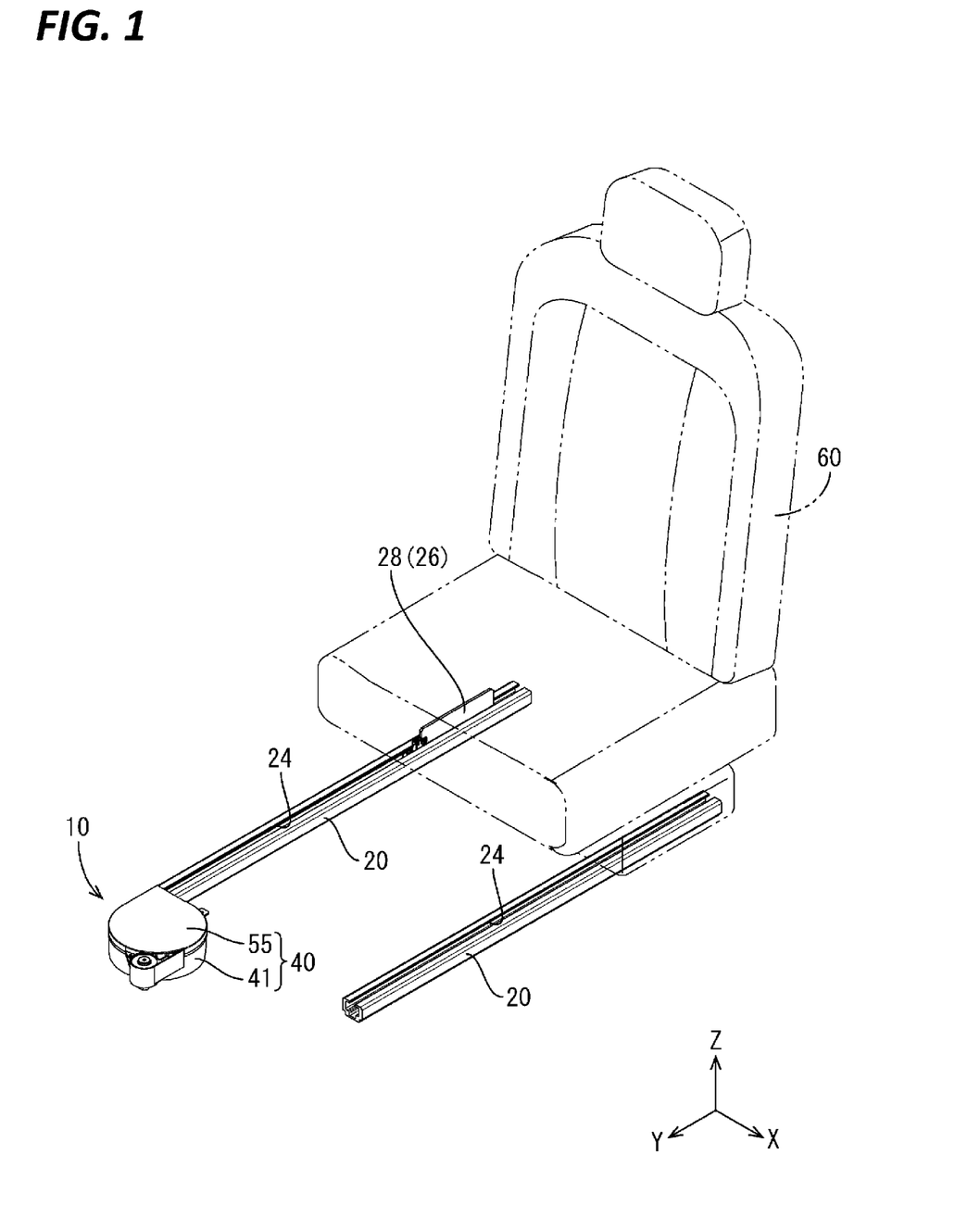
FIG. 1 is a perspective view of a wire harness routing device according to Embodiment 1.

As shown in FIG. 1, the seat 60 is slidable in the front-back direction with respect to two rails 20 that are fixed onto a floor of a passenger compartment of a vehicle body (not shown) by means of a known bolting method or the like. The seat 60 is equipped with various kinds of electrical equipment such as an electric recliner, a seat heater, a sensor for detecting whether or not an occupant is seated, and a sensor for detecting whether or not a seat belt is worn, for example Lower portions of the seat 60 are fixed to sliders 26 within the rails 20. Note that FIG. 1 only shows the slider 26 of one of the rails 20, and omits the slider of the other rail 20.

[Rail 20]

Figure 2:
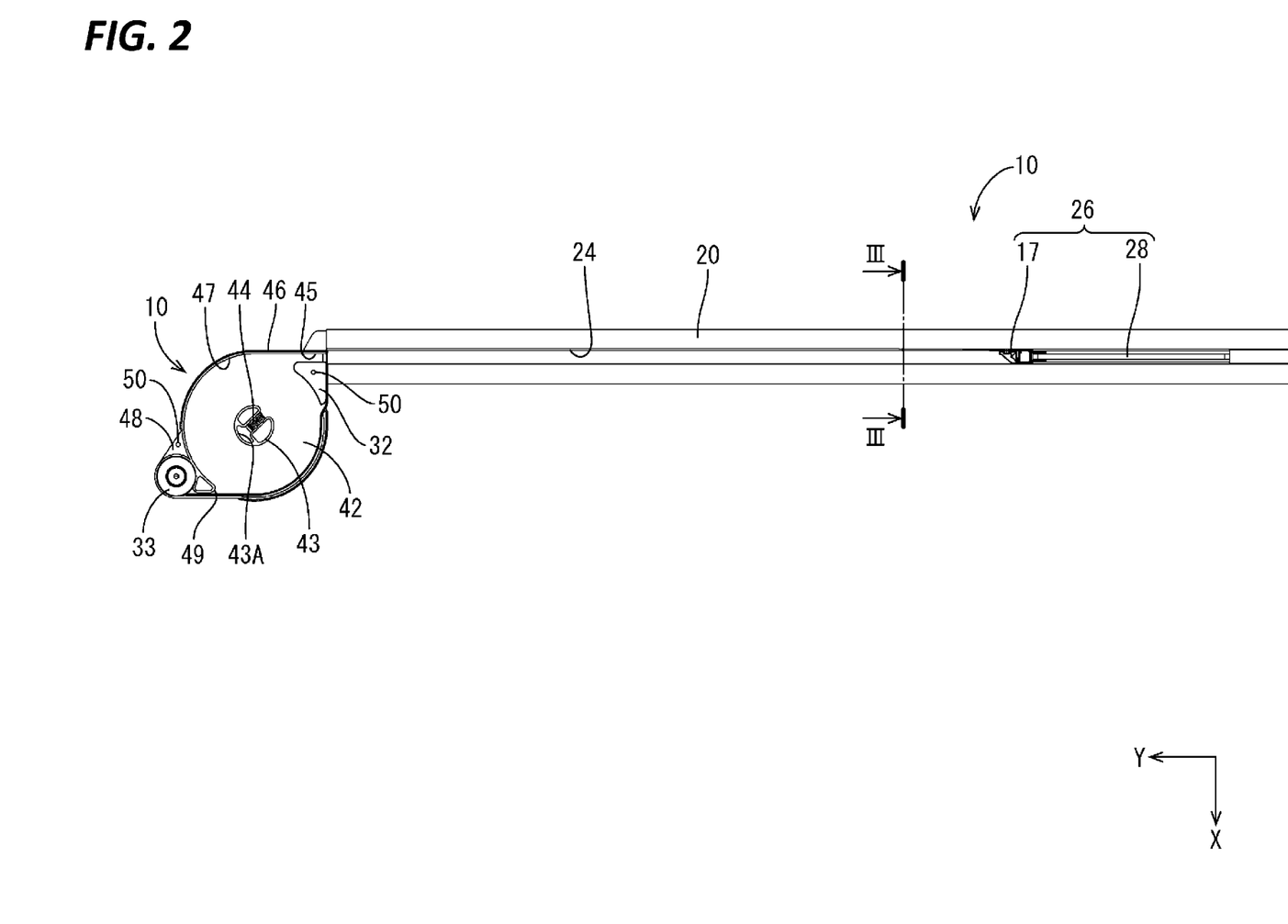
FIG. 2 is a plan view of the wire harness routing device with a slider located on a rear side of a rail.

The rails 20 are made of metal. A pair of rails 20 are provided for each seat 60 and extend linearly in the front-back direction, as shown in FIG. 1. Each rail 20 has an insertion hole 21 through which the slider 26 is inserted and that penetrates the rail 20 in the front-back direction, as shown in FIG. 2. The insertion hole 21 has a rectangular shape that is elongated in the left-right direction, and a bottom groove 22, which has a reduced width, is located on the lower side of the insertion hole 21 and extends in the front-back direction. A passage groove 24 that is in communication with the outside extends in a groove shape in the front-back direction above the insertion hole 21. Note that FIG. 2 omits a lid portion 55 and the wire harness 11 for convenience of description.

[Slider 26]

The slider 26 is made of a synthetic resin or metal, for example, and is slidable in the front-back direction with respect to the rail 20. The slider 26 has a slider body 27 that is arranged within the insertion hole 21, and an attachment portion 28 with a plate shape protruding upward from an upper face of the slider body 27. The width of the slider body 27 is larger than the interval in the passage groove 24. The attachment portion 28 slides between cutouts formed in a mat or the like on the floor, and is fastened to an attached portion (not shown) of the seat 60 by a fastening member (not shown) such as a bolt. A tubular guide member 17 through which a plurality of electric wires 12 are inserted is provided on the front side of the slider 26, as shown in FIG. 2. The direction in which the plurality of electric wires 12 extend is guided from the front-back direction to the vertical direction within the guide member 17.

[Wire Harness 11]

The wiring harness 11 is routed on or under the floor of the vehicle body, and is connected to devices such as ECUs (Electronic Control Units) on the vehicle body side. If a mat, a panel, or the like are arranged on the floor of the vehicle body, the wire harness 11 may be routed under the mat, the panel, or the like. Power and signals are transmitted and received between the devices on the vehicle body side and the electrical equipment of the seat 60 via the wire harness 11.

Figure 3:
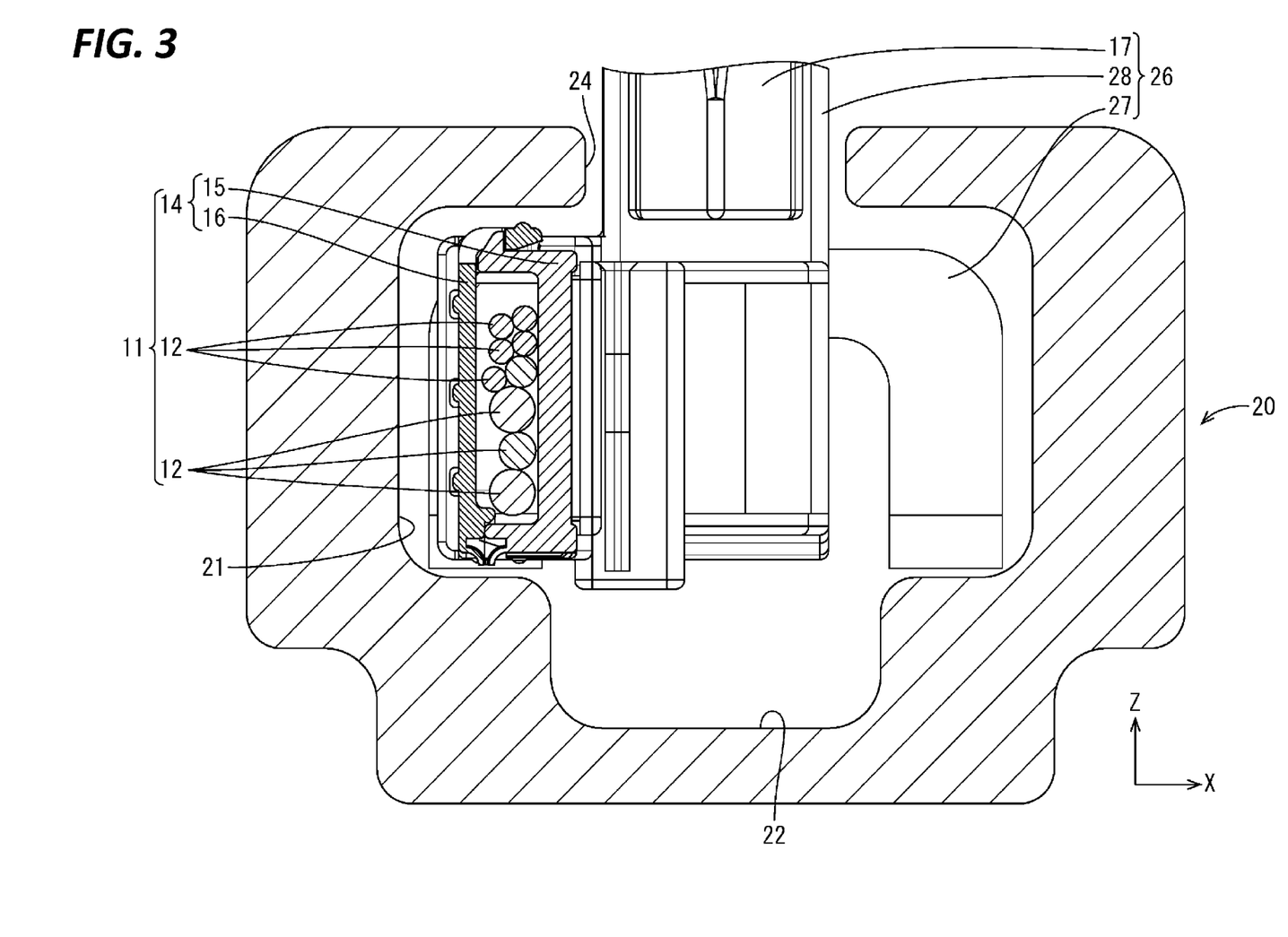
FIG. 3 is a cross-sectional view taken along a line III-III in FIG. 2.

The wire harness 11 routed between the seat 60 and the vehicle body is inserted in a rail 20 below the seat 60. The wire harness 11 includes a plurality of (nine in the present embodiment) electric wires 12 and an outer body 14 that collectively accommodates the plurality of electric wires 12, as shown in FIG. 3. Each electric wire 12 is a coated wire formed by coating a metal conductor portion with an insulating layer, and is connected to the electrical equipment of the seat 60.

The outer body 14 is made of an insulating synthetic resin, for example, and extends in a band shape in the front-back direction while surrounding the plurality of vertically arranged electric wires 12. The outer body 14 includes a band-shaped outer main body 15 and a band-shaped outer cover 16 that extend along the plurality of electric wires 12. Note that a portion of the wire harness 11 that is routed outside the rail 20 and an excess length accommodating portion 40 is routed with the plurality of electric wires 12 not covered by the outer body 14.

[Wire Harness Routing Device 10]

The wire harness routing device 10 includes the wire harness 11 and the excess length accommodating portion 40 in which an excess length portion 11A of the wire harness 11 is accommodated, as shown in FIG. 2.

[Excess Length Accommodating Portion 40]

The excess length accommodating portion 40 accommodates the excess length portion 11A of the wire harness 11 that is a portion not accommodated within the rail 20. The excess length accommodating portion 40 includes an accommodating portion body 41 and a lid portion 55, as shown in FIG. 1. The excess length accommodating portion 40 is arranged at a front end of a rail 20 located on the right side, of the two rails 20. The accommodating portion body 41 includes a bottom wall 42 with a flat plate shape and an accommodating wall 46 within which the wire harness 11 is spirally accommodated. The excess length accommodating portion 40 is formed by injection-molding an insulating synthetic resin.

Figure 4:
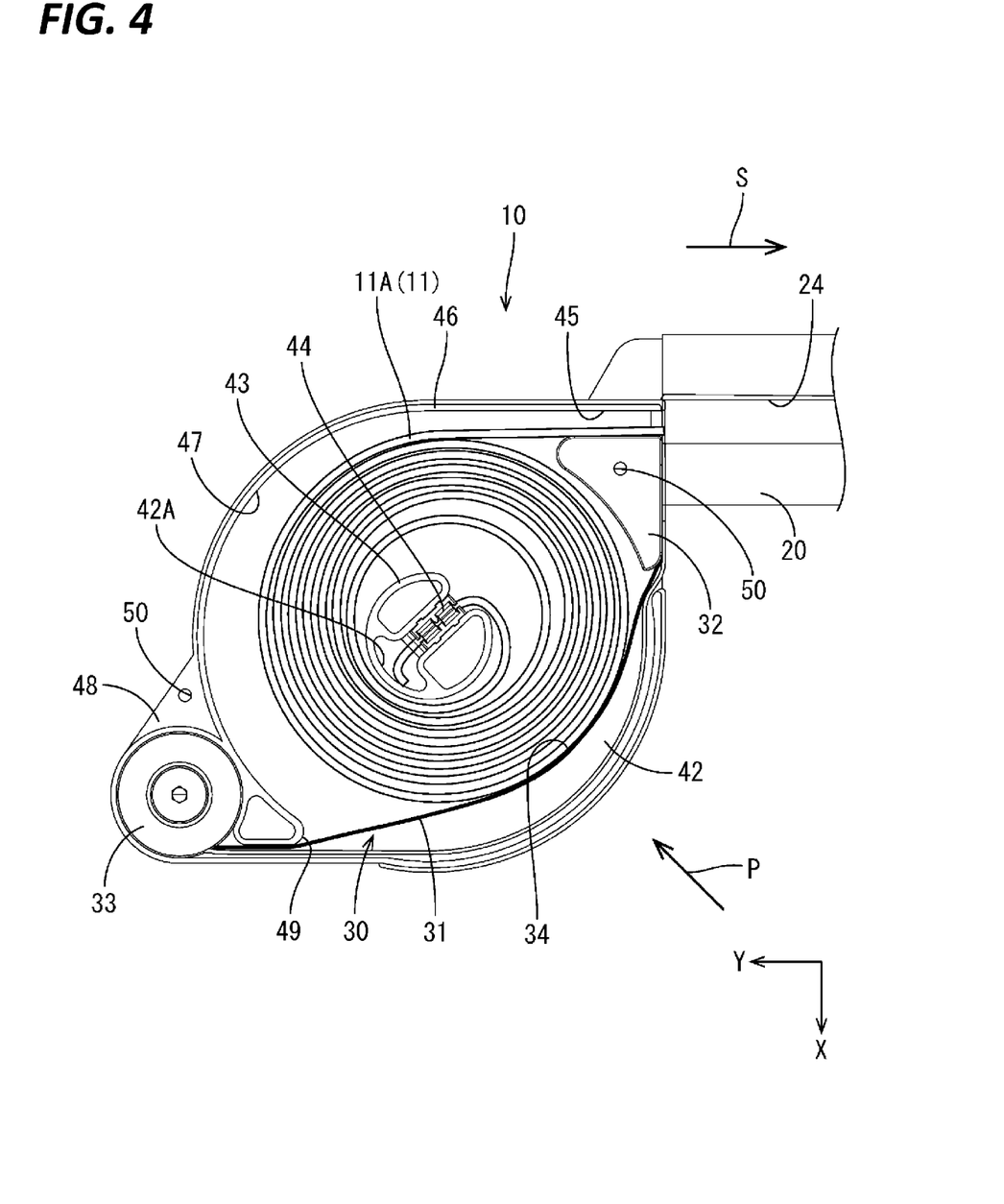
FIG. 4 is a partial enlarged plan view of an excess length accommodating portion from which a wire harness is being pulled out.

The bottom wall 42 has a substantially circular shape when viewed from above, as shown in FIG. 4. A lead-out portion 43 for leading out the wire harness 11 to a space on or under the floor of the vehicle, for example, is formed near the center of the bottom wall 42. The lead-out portion 43 has a tubular shape raised from near the center of the bottom wall 42, and is provided with a holding portion 44 that sandwiches the wire harness 11. An open hole 42A that vertically penetrates the bottom wall 42 is formed within the lead-out portion 43. The wire harness 11 is led out from this open hole 42A to a space on or under the floor of the vehicle, for example.

The accommodating wall 46 is raised upward from a side edge of the bottom wall 42, as shown in FIG. 4. An accommodating space for accommodating the wire harness 11 is formed between the bottom wall 42 and the accommodating wall 46. A fixing portion 32 for fixing a later-described elastic member 31 is arranged at a right rear end of the accommodating wall 46. The fixing portion 32 has a substantially triangular shape when viewed from above. The right edge of the fixing portion 32 linearly extends, substantially parallel to a right wall of the accommodating wall 46. The space between the right edge of the fixing portion 32 and the right wall of the accommodating wall 46 is in communication with the passage groove 24 of the rail 20. The interval in the left-right direction between the right edge of the fixing portion 32 and the right wall of the accommodating wall 46 is the same as or slightly smaller than the interval in the left-right direction of the passage groove 24. A front-end edge of the fixing portion 32 has the shape of a curved face.

A rear edge of the fixing portion 32 linearly extends in the left-right direction. A diagonally forward left side edge of the fixing portion 32 has an arc shape. The fixing portion 32 has a plurality of (two in the present embodiment) fastening portions 50 that allow the lid portion 55 to be screwed thereto. Each fastening portion 50 has a screw hole extending in the vertical direction.

A protruding portion 48 that has a substantially triangular shape when viewed from above protrudes diagonally forward to the left at the left front of the accommodating wall 46. A right rear side face of the protruding portion 48 has an arc shape. The protruding portion 48 has a plurality of (two in the present embodiment) fastening portions 50 that allow the lid portion 55 to be screwed thereto. Each fastening portion 50 has a screw hole extending in the vertical direction.

An accommodating space 47 in which the wire harness 11 is accommodated is formed to have a substantially circular shape when viewed from above, by an inner face of the accommodating wall 46, a left front side face of the fixing portion 32, and a right rear side face of the protruding portion 48.

The lid portion 55 has a flat plate shape that corresponds to the shape of the accommodating portion body 41, as shown in FIG. 1. The lid portion 55 is screwed to the fastening portions 50 of the accommodating portion body 41. The accommodating space 47 is closed by the lid portion 55 with the lid portion 55 screwed to the accommodating portion body 41.

[Guide Portion 30]

Figure 5:
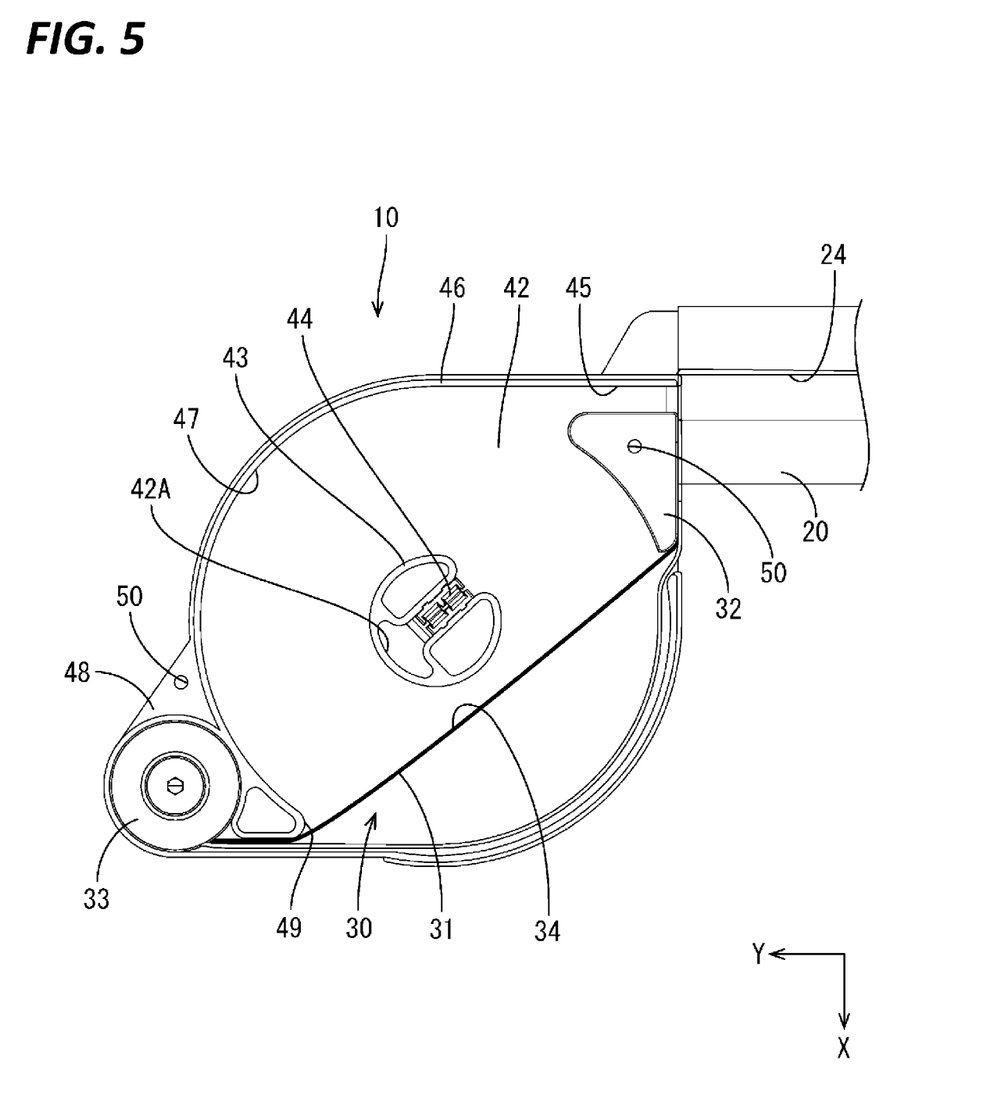
FIG. 5 is a partial enlarged plan view of the excess length accommodating portion.
Figure 6:
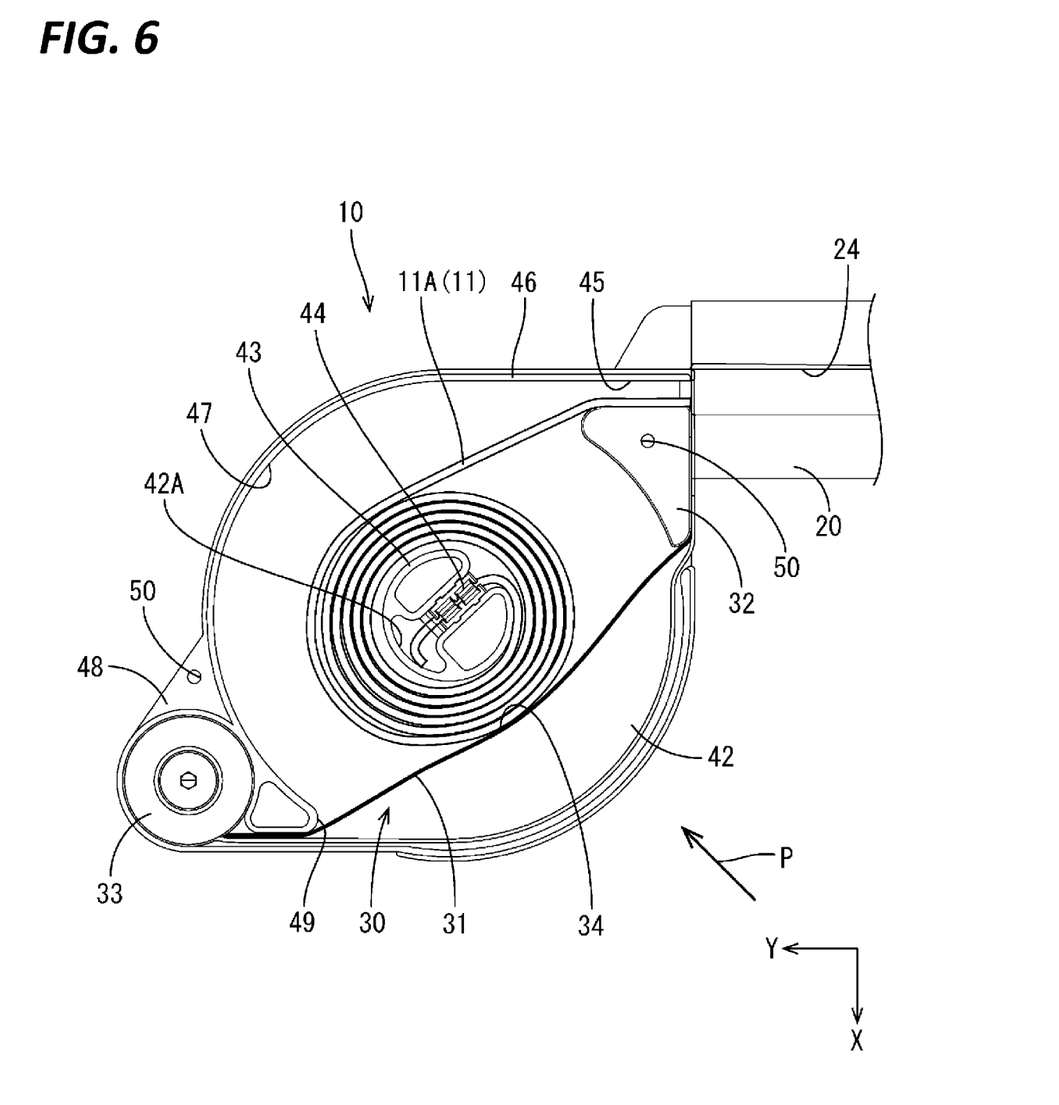
FIG. 6 is a partial enlarged plan view of the excess length accommodating portion when the slider is located on the rear side of the rail.

As shown in FIG. 5, a guide portion 30 has a leaf spring-shaped elastic member 31 made of metal, a fixing portion 32 that fixes a rear end (an example of "one end") of the elastic member 31, and a winding portion 33 that winds a front end (an example of "another end") of the elastic member 31. Note that FIG. 5 omits the wire harness 11 for convenience of description.

[Elastic Member 31]

The elastic member 31 has the shape of a thin-walled, elastically deformable leaf spring made of a strip of metal such as copper, a copper alloy, aluminum, an aluminum alloy, or stainless steel. The rear end of the elastic member 31 is fixed to the fixing portion 32 by means of a known method such as welding or screwing. The winding portion 33 that winds the front end of the elastic member 31 is arranged in the protruding portion 48. An opening portion 49 through which the elastic member 31 is pulled out from the winding portion 33 or wound back around the winding portion 33 is provided at the left rear of the protruding portion 48. The rear edge of the opening portion 49 is rounded.

The elastic member 31 is bent at a fixed curvature in its natural state where no external force is applied, and the restoring force (load) that occurs when the elastic member 31 is stretched straight is fixed. The elastic member 31 spanning between a left end of the fixing portion 32 and the opening portion 49 of the protruding portion 48 does not come into contact with the lead-out portion 43 in its natural state, as shown in FIG. 5.

A side face of the elastic member 31 on the inner side in the radial direction of the accommodating portion body 41 serves as a contact portion 34 that comes into contact with the wire harness 11, as shown in FIG. 4. Elastic contact between the elastic member 31 and the wire harness 11 biases the wire harness 11 inward in the radial direction of the accommodating portion body 41 (in the direction indicated by a P arrow).

The winding portion 33 is rotatable around a shaft portion (not shown). The elastic member 31 is freely pulled out from or wound by the winding portion 33.

[Description of Operations of Guide Portion 30]

Next, a description will be given of operations of the guide portion 30 performed when the seat 60 slides. When the seat 60 is located on the rear side of the rail 20 (the state shown in FIG. 6), the wire harness 11 is pulled out from the excess length accommodating portion 40. For this reason, the excess length portion 11A is wound around the outer periphery of the lead-out portion 43 substantially without any gap within the excess length accommodating portion 40. The contact portion 34 of the elastic member 31 comes into contact, from the outer side in the radial direction of the accommodating portion body 41, with the diagonally rearward left of the excess length portion 11A wound around the lead-out portion 43. The excess length portion 11A that is wound around the lead-out portion 43 by the elastic member 31 is biased toward the center in the radial direction of the accommodating portion body 41 as indicated by the P arrow.

Figure 7:
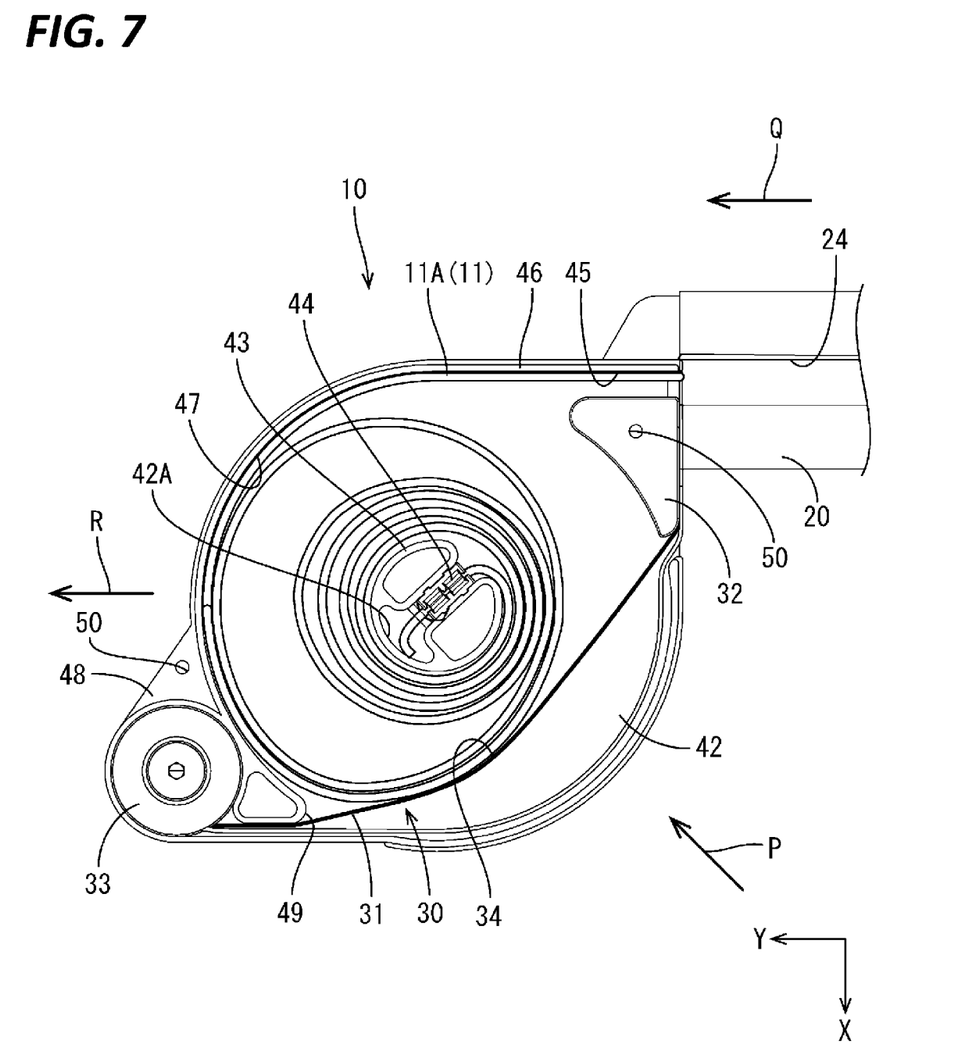
FIG. 7 is a partial enlarged plan view of the excess length accommodating portion when the slider is moving forward.

Next, FIG. 7 shows the state where the seat 60 has moved slightly forward. The excess length portion 11A that has entered the excess length accommodating portion 40 from the entrance 45 of the excess length accommodating portion 40 is pushed forward (in the direction indicated by a Q arrow) from the entrance 45. As a result, the excess length portion 11A in the excess length accommodating portion 40 is pressed against the inner side of the accommodating wall from behind by being pushed forward (in the direction indicated in an R arrow).

As a result of the excess length portion 11A being pushed into the excess length accommodating portion 40, the contact portion 34 of the elastic member 31 is pushed outward in the radial direction of the accommodating portion body 41 by the excess length portion 11A. Thus, the elastic member 31 is pulled out from the winding portion 33. This moves the position of the contact portion 34 of the elastic member 31 outward in the radial direction of the accommodating portion body 41.

As mentioned above, the excess length portion 11A wound around the lead-out portion 43 is biased toward the center in the radial direction of the accommodating portion body 41 as indicated by the P arrow. Therefore, the direction in which the excess length portion 11A pushed into the excess length accommodating portion 40 enters is changed to a radially inward direction of the accommodating portion body 41 (the direction indicated by the P arrow) by the elastic member 31. Thus, the winding center of the excess length portion 11A that has entered the excess length accommodating portion 40 is a position slightly shifted from the lead-out portion 43. As a result, a gap is formed between a portion of the excess length portion 11A that has just entered the excess length accommodating portion 40 from the entrance 45 and a portion of the excess length portion 11A that has made one lap around the lead-out portion 43.

Figure 8:
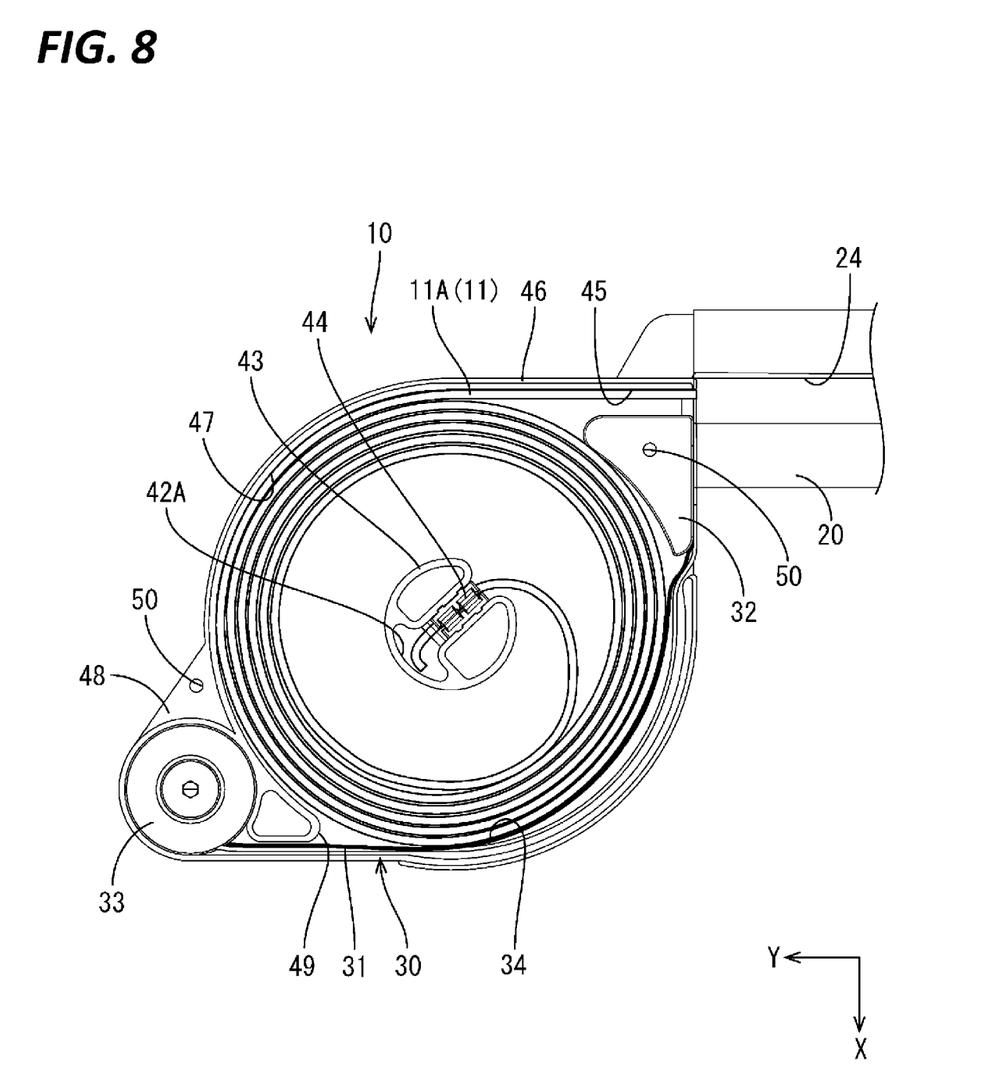
FIG. 8 is a partial enlarged plan view of the excess length accommodating portion when the slider is located on a front side.

Furthermore, as the seat 60 moves forward, the excess length portion 11A that has been wound around the lead-out portion 43 is separated from the lead-out portion 43, as shown in FIG. 8. Then, the excess length portion 11A is pressed against an inner wall of the accommodating wall 46. The elastic member 31 is pushed by the excess length portion 11A and thus pulled out further from the winding portion 33. The portion of the excess length portion 11A that has just entered the excess length accommodating portion 40 from the entrance 45 is in intimate contact with the portion of the excess length portion 11A that has made one lap around the lead-out portion 43, as shown in FIG. 8. Therefore, the excess length portion 11A cannot further enter the excess length accommodating portion 40. In this state, portions of the excess length portion 11A that have entered the excess length accommodating portion 40 are in intimate contact with each other.

Next, as the seat 60 is moved backward, the excess length portion 11A is pulled out rearward of the excess length accommodating portion 40 (in the direction indicated by an S arrow) from the entrance 45, as shown in FIG. 4. Then, the excess length portion 11A is wound around the outer periphery of the lead-out portion 43 with gaps between portions of the excess length portion 11A narrowing gradually. The elastic member 31 is wound by the winding portion 33. At this time, the excess length portion 11A is biased inward in the radial direction of the accommodating portion body 41 (in the direction indicated by the P arrow) by the elastic member 31, and can therefore be easily grouped. The excess length portion 11A is thus pulled out smoothly from the excess length accommodating portion 40.

[Operation and Effects of Present Embodiment]

Subsequently, operation and effects of the present embodiment will be described. Before describing operation and effects of the present embodiment, Comparative Example 1 will be described with reference to FIG. 9. Note that in Comparative Example 1, the same structures as those of Embodiment 1 were assigned the same reference numerals.

Figure 9:
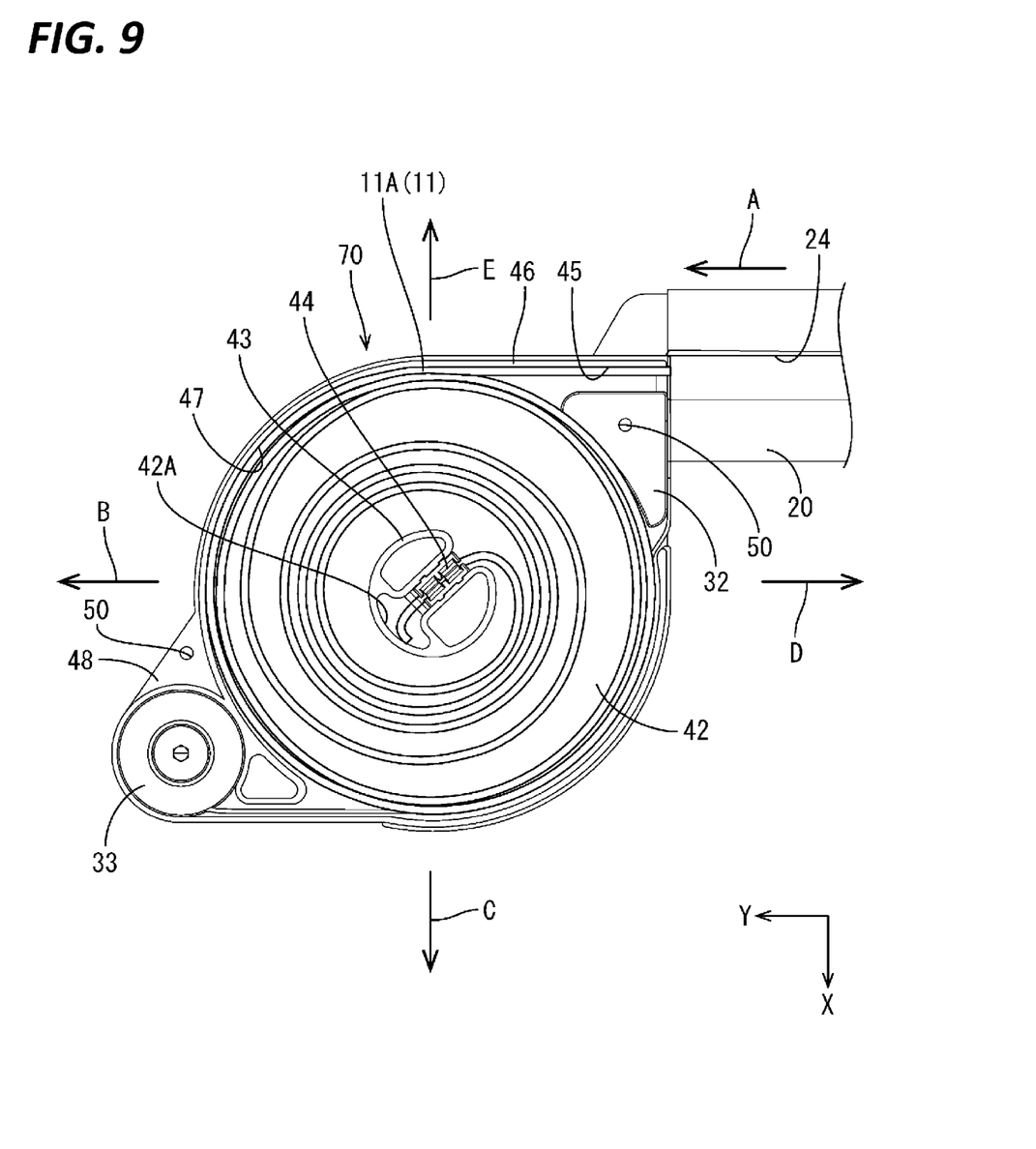
FIG. 9 is a partial enlarged plan view of an excess length accommodating portion according to Comparative Example 1.

An excess length accommodating portion 70 according to Comparative Example 1 shown in FIG. 9 is different from the excess length accommodating portion 40 described in Embodiment 1 in that the excess length accommodating portion 70 does not have the guide portion 30. In this excess length accommodating portion 70, when the excess length portion 11A of the wire harness 11 is pushed forward (in the direction indicated by an A arrow) from the entrance 45, the excess length portion 11A that has entered the accommodating portion body 41 is pressed against the inner face of the accommodating wall 46 outward in the radial direction of the accommodating portion body 41 (in the direction indicated by a B arrow). When the excess length portion 11A is further continuously pushed into the accommodating portion body 41, a portion of the excess length portion 11A that has entered the accommodating portion body 41 makes one lap around the lead-out portion 43 while constantly pressed outward (in the directions indicated by C and D arrows) against the inner face of the accommodating wall 46.

The portion of the excess length portion 11A that has made one lap within the accommodating portion body 41 is further pushed by a portion of the excess length portion 11A that has been further pushed into the accommodating portion body 41, and is, as a result, pressed against a portion of the excess length portion 11A that has just entered the accommodating portion body 41 from the entrance 45, outward in the radial direction of the accommodating portion body 41 (in the direction indicated by an E arrow). Then, the portion of the excess length portion 11A that has just pushed into the accommodating portion body 41 is sandwiched between the accommodating wall body 46 and the portion of the excess length portion 11A that has made one lap within the accommodating portion body 41. As a result, the excess length portion 11A cannot further enter the accommodating portion body 41 even though there are gaps between portions of the excess length portion 11A that have entered the excess length accommodating portion 40.

In view of the above, the wire harness routing device 10 according to the present embodiment has: a wire harness 11 with a rear end fixed to a slider 26 arranged slidably with respect to a rail 20 and a front end pulled out from the rail 20; an excess length accommodating portion 40 that has an entrance 45 from which an excess length portion 11A of the wire harness 11 pulled out from the rail 20 is introduced and that is configured to spirally wind the excess length portion 11A and accommodate the excess length portion 11A; and a guide portion 30 that is in the excess length accommodating portion 40 and that is configured to change the direction in which the excess length portion 11A enters the excess length accommodating portion 40 to an inward direction of the excess length accommodating portion 40 by coming into contact with the excess length portion 11A.

The direction in which the excess length portion 11A enters the excess length accommodating portion 40 is changed to the inward direction of the excess length accommodating portion 40 by the guide portion 30. Therefore, the excess length portion 11A that has entered the excess length accommodating portion 40 from the entrance 45 is not pressed outward against the accommodating wall 46 of the excess length accommodating portion 40. As a result, a portion of the excess length portion 11A that has entered the excess length accommodating portion 40 and made one lap within the excess length accommodating portion 40 is unlikely to be pressed against a portion of the excess length portion 11A that is about to enter the excess length accommodating portion 40 from the entrance 45. This configuration allows the excess length portion 11A to smoothly enter the excess length accommodating portion 40.

According to the present embodiment, the guide portion 30 has a contact portion 34 configured to come into contact with the wire harness 11. The contact portion 34 is movable in the radial direction of the excess length accommodating portion 40.

Movement of the contact portion 34 according to the accommodation state of the excess length portion 11A in the excess length accommodating portion 40 allows the excess length portion 11A to appropriately change the direction of entering the excess length accommodating portion 40.

According to the present embodiment, the guide portion 30 has an elastic member 31 configured to bias the excess length portion 11A inward of the excess length accommodating portion 40.

Since the excess length portion 11A is biased inward of the excess length accommodating portion 40 by the elastic member 31, the excess length portion 11A is restrained from being pressed against the side wall of the excess length accommodating portion 40. As a result, the excess length portion 11A can smoothly enter the excess length accommodating portion 40.

According to the present embodiment, the elastic member 31 has a leaf spring shape. The excess length accommodating portion 40 has a fixing portion 32 configured to fix a rear end of the elastic member 31 and a winding portion 33 configured to wind a front end of the elastic member 31.

The length by which the elastic member 31 is wound by the winding portion 33 changes in accordance with the length by which the excess length portion 11A enters the excess length accommodating portion 40. Accordingly, an appropriate biasing force can be applied to the excess length portion 11A. This configuration allows the excess length portion 11A to more smoothly enter the excess length accommodating portion 40.

Other Embodiments (1) In the excess length accommodating portion 40, the number of times that the wire harness 11 is wound around the lead-out portion 43 is not limited to the winding number of the above embodiment, and may be any other winding number.
(2) The winding portion 33 may be arranged at a different position.
(3) The number of electric wires 12 that constitute the wire harness 11 is not limited to the number of the above embodiment, and may be changed to various numbers. For example, the wire harness 11 may be constituted by one electric wire 12. The shape of the outer body 14 that protects the electric wires 12 is not limited to the shape of the above embodiment, and may be changed in various manners. For example, the wire harness 11 may be constituted only by the electric wires 12 without using the outer body 14.
(4) The slider 26 is fixed to the seat 60 serving as a slidable object, but this need not be the case. For example, a slide door may be used as a slidable object, and the slider 26 may be fixed to the slide door.
(5) The guide portion 30 may be an actuator capable of changing the direction in which the wire harness 11 enters by moving in the radial direction of the accommodating portion body 41 in conjunction with movement of the seat 60.
(6) The elastic member 31 may be a spring of any shape, such as a spiral spring or a cone spring.
(7) A plurality of elastic members 31 may be provided within one excess length accommodating portion 40.

LIST OF REFERENCE NUMERALS

10 Wire harness routing device
11 Wire harness
11A Excess length portion
12 Electric wire
14 Outer body
15 Outer main body
16 Outer cover
17 Guide member
20 Rail
21 Insertion hole
22 Bottom groove
24 Passage groove
26 Slider
27 Slider body
28 Attachment portion
30 Guide portion
31 Elastic member
32 Fixing portion
33 Winding portion
34 Contact portion
40 Excess length accommodating portion
41 Accommodating portion body
42 Bottom wall
43 Lead-out portion
42A Open hole
44 Holding portion
45 Entrance
46 Accommodating wall
47 Accommodating space
48 Protruding portion
49 Opening portion
50 Fastening portion
55 Lid portion
60 Seat
70 Excess length accommodating portion

What is claimed is:
1. A wire harness routing device comprising:
a wire harness with one end fixed to a slider that is slidably arranged with respect to a rail and another end pulled out from the rail;
an excess length accommodating portion that has an entrance into which an excess length portion of the wire harness pulled out from the rail is introduced and a lead-out portion around which the excess length portion of the wire harness is woundable and that is configured to spirally wind the excess length portion and accommodate the excess length portion therein; and a guide portion that is disposed in the excess length accommodating portion and that includes an elastic member configured to change a direction in which the excess length portion enters the excess length accommodating portion to an inward direction of the excess length accommodating portion by coming into contact with the excess length portion, a fixing portion configured to fix one end of the elastic member, and a winding portion configured to wind another end of the elastic member, wherein at least a portion of the wire harness is disposed between the lead-out portion of the excess length accommodating portion and the elastic member of the guide portion.

2. The wire harness routing device according to claim 1, wherein the guide portion has a contact portion configured to come into contact with the wire harness, and the contact portion is movable in a radial direction of the excess length accommodating portion.

3. The wire harness routing device according to claim 1, wherein the elastic member is configured to bias the excess length portion inward of the excess length accommodating portion.

4. The wire harness routing device according to claim 1, wherein the elastic member has a leaf spring shape.

5. The wire harness routing device according to claim 1, wherein the lead-out portion is arranged between the fixing portion and the winding portion.

\* \* \* \* \*